July 24, 1928.
E. T. FERNGREN
1,678,247
METHOD AND MEANS FOR FEEDING AND SHAPING MOLTEN GLASS
Filed Dec. 1, 1924 6 Sheets-Sheet 1
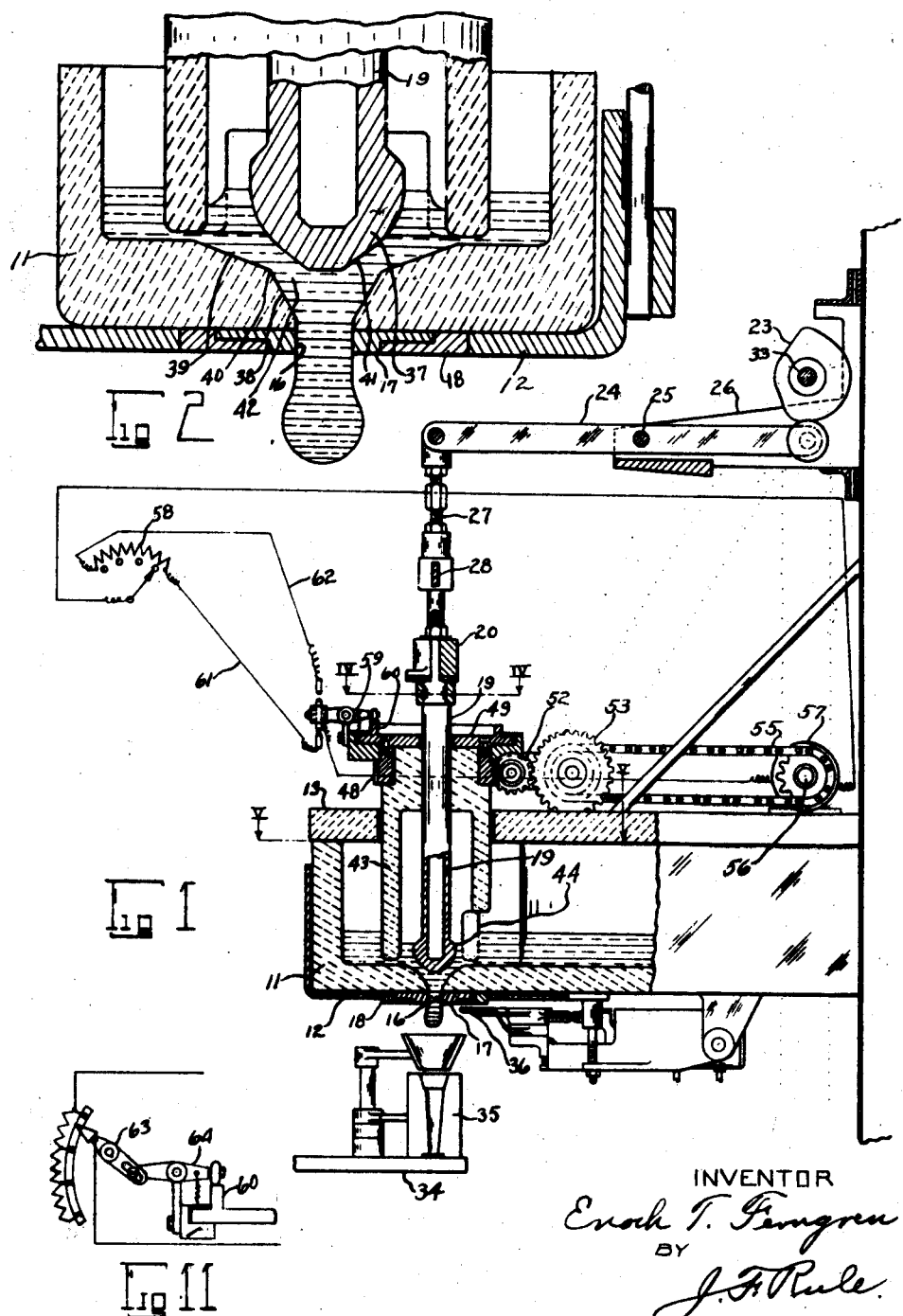
INVENTOR
Enoch T. Ferngren
BY
J. F. Rule
HIS ATTORNEY July 24, 1928.  1,678,247
E. T. FERNGREN
METHOD AND MEANS FOR FEEDING AND SHAPING MOLTEN GLASS
Filed Dec. 1, 1924   6 Sheets-Sheet 2
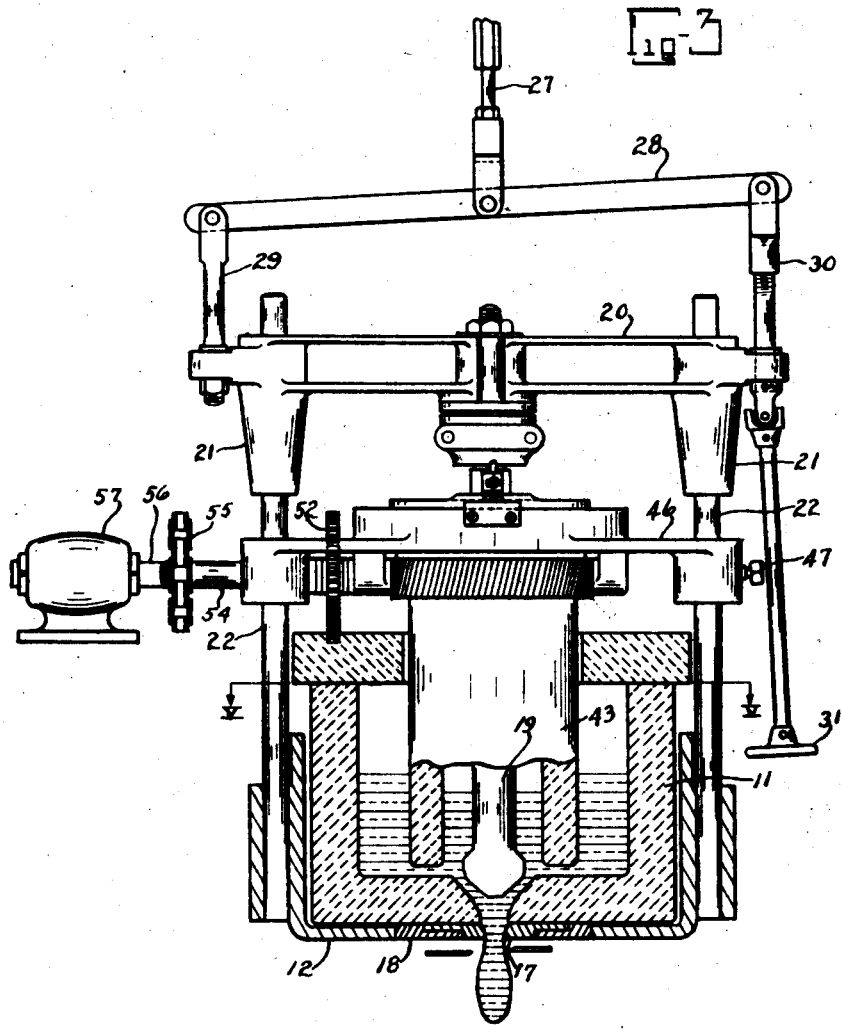
INVENTOR
Enoch T. Ferngren
BY
J. F. Riele
HIS ATTORNEY July 24, 1928.

E. T. FERNGREN 1,678,247

METHOD AND MEANS FOR FEEDING AND SHAPING MOLTEN GLASS

Filed Dec. 1, 1924  6 Sheets-Sheet 3

INVENTOR
Enoch T. Ferngren
BY
J. F. Rule
HIS ATTORNEY

July 24, 1928.
E. T. FERNGREN
1,678,247
METHOD AND MEANS FOR FEEDING AND SHAPING MOLTEN GLASS
Filed Dec. 1, 1924
6 Sheets-Sheet 4
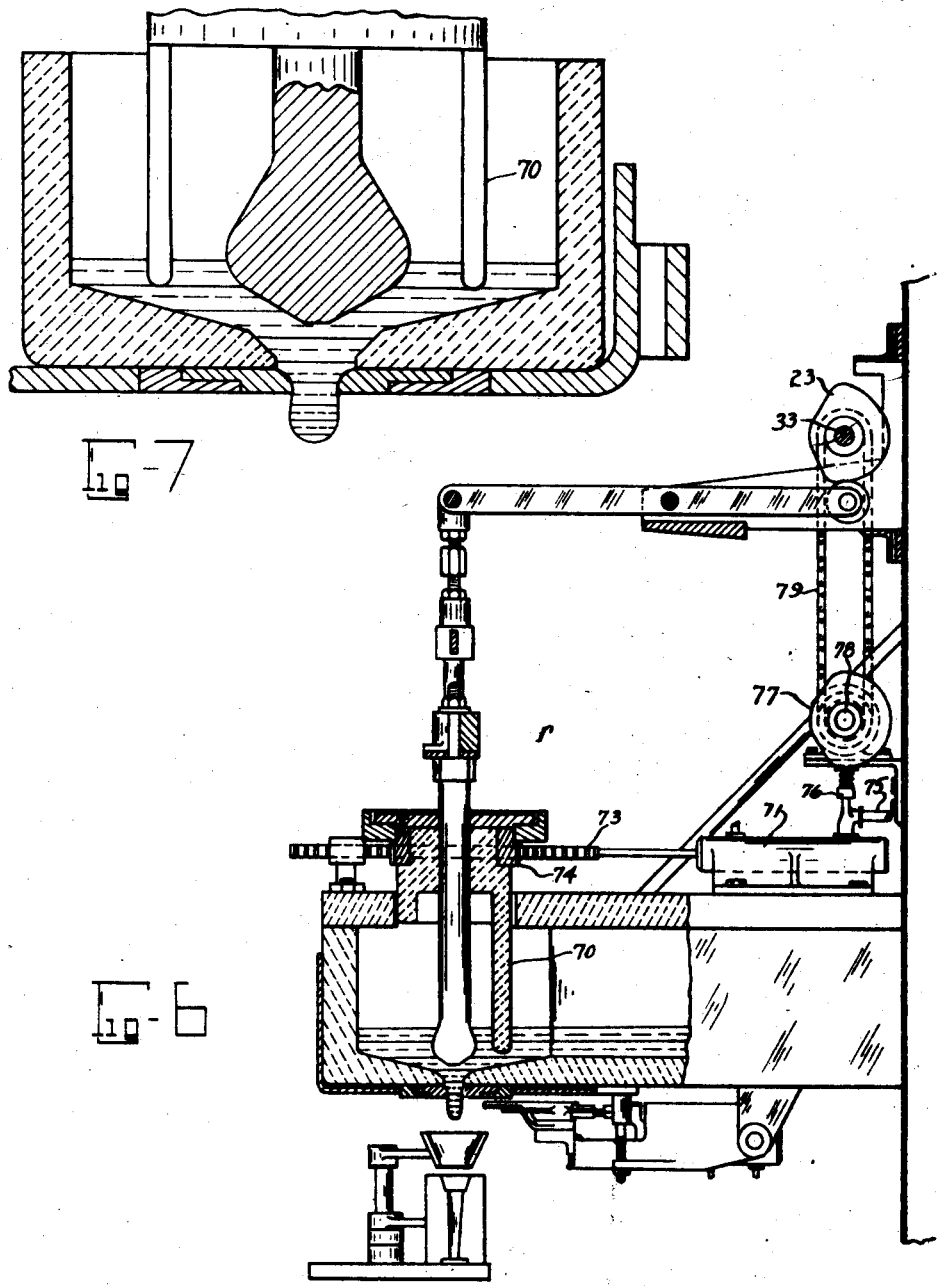
INVENTOR
Enoch T. Ferngren
BY
J. F. Rule
HIS ATTORNEY July 24, 1928. 1,678,247
E. T. FERNGREN
METHOD AND MEANS FOR FEEDING AND SHAPING MOLTEN GLASS
Filed Dec. 1, 1924 6 Sheets-Sheet 5
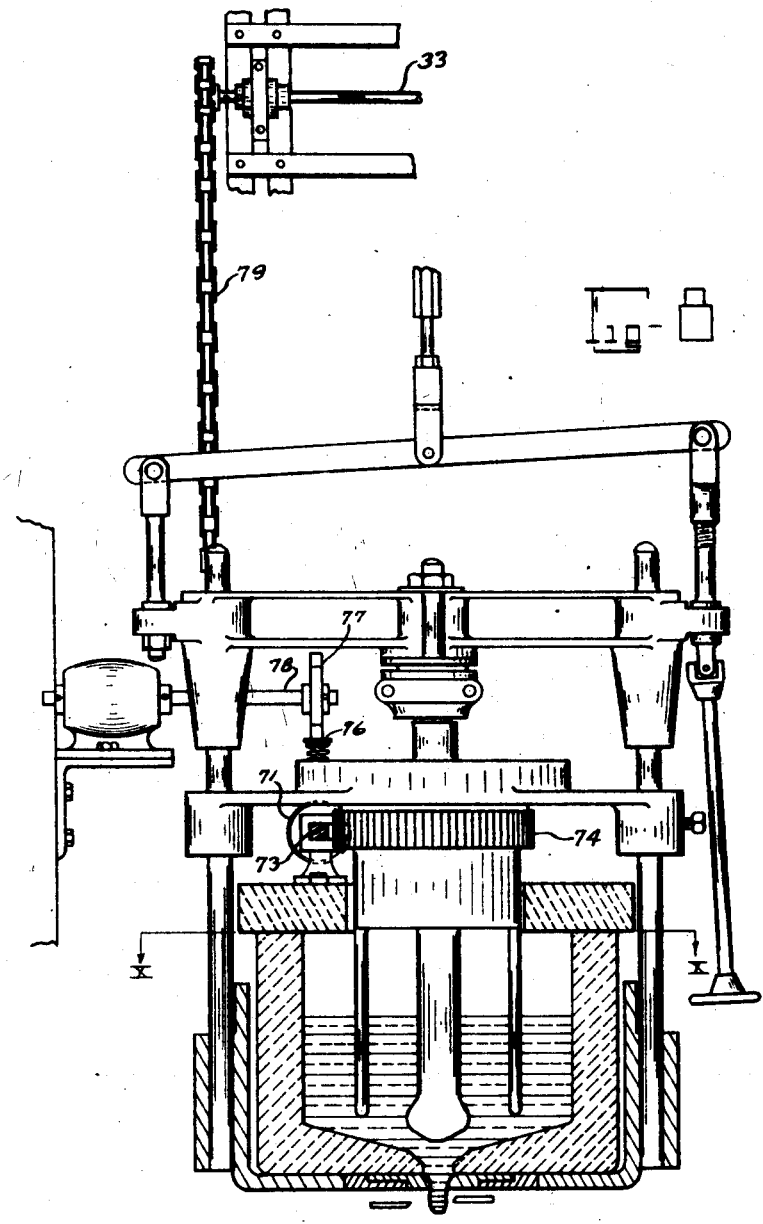
INVENTOR
Enoch T. Ferngren
BY
J. F. Rule
HIS ATTORNEY July 24, 1928.

E. T. FERNGREN 1,678,247

METHOD AND MEANS FOR FEEDING AND SHAPING MOLTEN GLASS

Filed Dec. 1, 1924     6 Sheets-Sheet 6

INVENTOR
Enoch T. Ferngren
BY J. F. Rule
HIS ATTORNEY

Patented July 24, 1928.

1,678,247

UNITED STATES PATENT OFFICE.

ENOCH T. FERNGREN, OF TOLEDO, OHIO, ASSIGNOR TO THE OWENS BOTTLE COMPANY, OF TOLEDO, OHIO, A CORPORATION OF OHIO.

METHOD AND MEANS FOR FEEDING AND SHAPING MOLTEN GLASS.

Application filed December 1, 1924. Serial No. 753,107.

My invention relates to apparatus for feeding glass from a molten supply and shaping it into formed charges adapted for entering the molds of a forming machine. More particularly, the invention relates to that type of glass feeder in which the glass is caused to issue through an outlet in the bottom of a furnace forehearth or other container, the discharge of glass being regulated and controlled by a regulating device or plunger operating periodically within the container.

An object of the invention is to provide improved means for controlling the flow of glass to the outlet, maintaining a proper circulation and mixing of the glass, preventing stagnation and causing a discharge of homogeneous glass in symmetrical form and free from one-sided chilling.

A further object of the invention is to provide an improved form of plunger or regulator working within the glass and co-operating with the walls of the container in a manner to obtain a powerful expelling action and an effective control of the glass by a comparatively small movement of the regulator, the walls of the container being suitably shaped to coact with the regulator in effecting such results.

Other objects of the invention will appear hereinafter.

In the accompanying drawings:

Figure 1 is a part sectional elevation of a glass feeding apparatus constructed in accordance with my invention.

Figure 2 is a sectional elevation on a larger scale showing a portion of the regulator and container, the view being taken at right angles to that of Figure 1.

Figure 3 is a part sectional front elevation of the apparatus shown in Figure 1.

Figure 4:
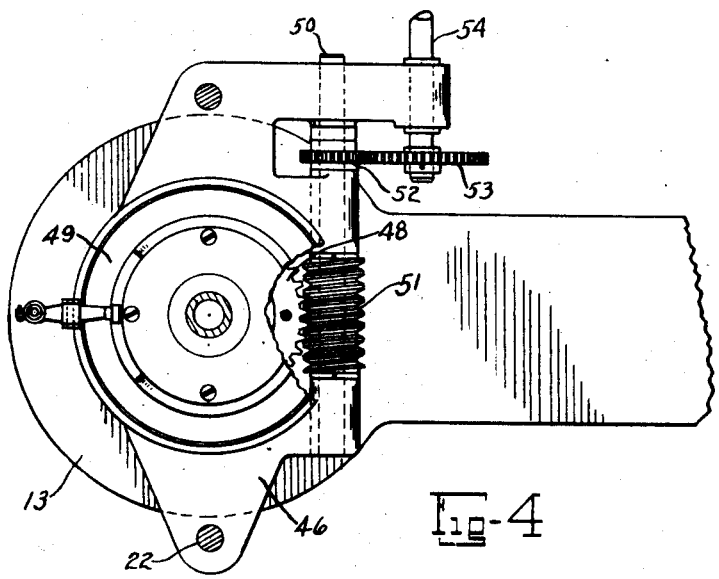
Figure 4 is a part sectional plan view, parts being broken away, the section being taken at the line IV—IV on Figure 1.
Figure 5:
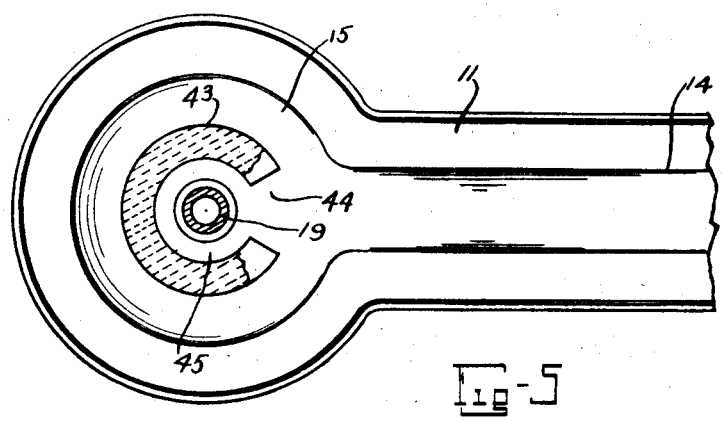
Figure 5 is a part sectional plan substantially at the plane of the line V—V on Figure 1.
Figure 9:
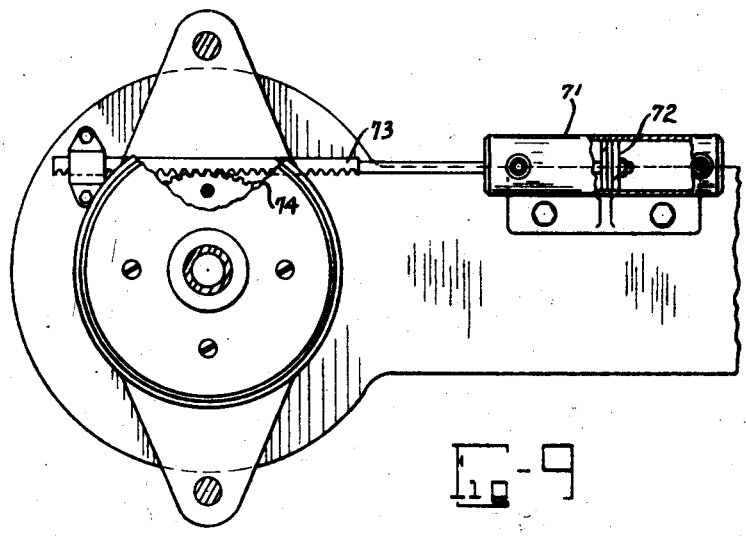
Figure 10:
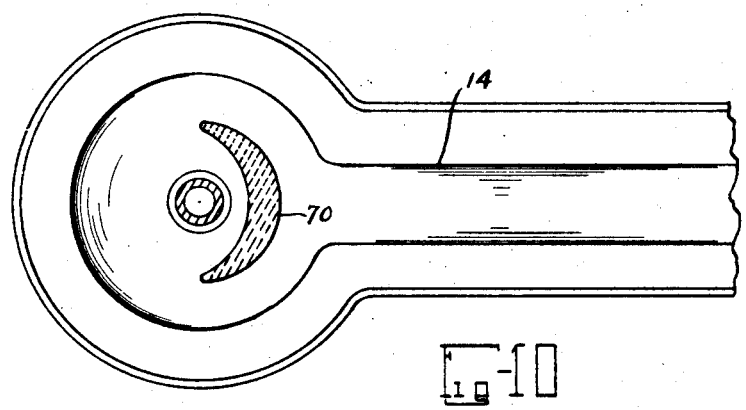

Figures 6 to 10, inclusive, illustrate a modified construction. Figure 6 is a part sectional side elevation of such construction. Figure 7 is an enlarged sectional front elevation through the regulator and container. Figure 8 is a sectional front elevation of the construction shown in Figure 6. Figure 9 is a sectional plan view of mechanism shown in Figure 8, some parts being broken away and other parts omitted. Figure 10 is a sectional plan at the plane of the line X—X on Figure 8.

Figure 11 is a diagrammatic view of a modified form of rheostat control for the electric motor.

Referring particularly to Figures 1 to 5 inclusive, the container 11 may consist of a furnace boot or forehearth made of fire clay and supported by a metal framework 12. A cover 13 is provided for the container. The molten glass flows from the main furnace outward through a channel 14 which, at its forward end, terminates in a substantially cylindrical chamber or basin 15 provided with an outlet opening or passageway 16 extending through the floor thereof. The outlet extends through a clay bushing 17 removably held in place by a ring 18, permitting the bushing to be replaced by other bushings, whereby the size of the outlet may be adjusted.

The issuance of glass through the outlet 16 is regulated and controlled by a regulating member 19 herein shown as a hollow clay plug or plunger projecting downward into the glass over the outlet. The plunger is connected at its upper end to a horizontal yoke 20 provided at its ends with bearing sleeves 21, by which the yoke is slidably mounted to reciprocate vertically on standards 22 rising from the frame 12. The yoke and plunger are periodically reciprocated vertically by means of a continuously rotating cam 23 operating through a lever 24 fulcrumed at 25 on a stationary bracket 26. The forward end of the lever has a connection 27 with an adjusting bar 28 connected at its ends to posts 29 and 30 at opposite ends of the yoke 20. The post 30 comprises sections threaded together, by which the length of the post may be adjusted, such adjustment being effected by a hand wheel 31. In this manner, the plunger 19 may be adjusted vertically. The cam 23 is mounted on a continuously rotating shaft 33 which may be suitably geared to run in synchronism with the glass forming machine to which the charges of glass are supplied. Said machine may comprise a rotating mold carriage 34 on which are mounted molds 35 brought in succession to charge receiving position beneath the outlet 16. Shears 36 operate periodically in synchronism with the reciprocations of the plunger to sever the suspended charges of glass and permit them to drop into the molds.

The plunger 19 is enlarged at its lower end to form a head 37 of materially larger diameter than the outlet opening. The walls of the outlet comprise a comparatively steep portion 38 (Fig. 2) converging downward toward the outlet, and a portion 39 inclined at a less angle to the horizontal and meeting the surface 38 at the circumferential line 40. The head 37 is tapered and presents a substantially frusto-conical or inclined surface 41 opposite the surfaces 39, 38, and providing an annular passageway 42 through which the glass flows downward toward the outlet. It will be noted that the channel 42 is narrowest where it passes the line 40, the walls 39 and 41 being upwardly divergent above said line, the walls 41 and 38 being downwardly divergent below said line.

Owing to the shape and relative arrangement of these walls, the glass beneath the plunger and below the line 40 will have, mainly, a downward movement as the plunger descends. Owing to the restriction of the passageway at the line 40, the glass beneath the plunger is in a large measure confined, so that approximately the full force of the plunger will be exerted in expelling the glass. Also, during the descent of the plunger, the glass above the line 40 will have, mainly, an upward divergent movement which is freely permitted by the divergency of the walls 39 and 41. The construction just described is particularly adapted for producing charges of considerable volume, although not limited to such use.

The shape of the plunger head 37 and the cooperating walls therebeneath is such that a comparatively small up and down movement of the head is required to exert the necessary expelling and retracting force for controlling and shaping the issuing glass. The movement of the glass in the container 11, and particularly the backward movement of the glass above the line 40 during the descent of the plunger, as above described, is such that the glass is agitated and mixed, maintaining it in a uniform homogeneous condition, preventing stagnation or one-sided chilling.

In a glass feeder of the general type herein shown, in which the glass flows from the main furnace or refining tank to an outlet in the forehearth, there is always a tendency for the flow to be established in a definite channel, the glass following the path of least resistance. The surrounding glass outside the direct line of flow stagnates and becomes chilled. As a result, the issuing glass lacks uniformity of temperature and quality, the flow is unsymmetrical, temperature conditions are difficult to regulate, and various other adverse conditions arise.

In order to effectively overcome these objections, the present invention provides means by which the said channel through which the glass flows is continually shifted, thereby preventing chilling and stagnation, and insuring a uniform quality of glass as discharged at the outlet. Such means comprises a hollow substantially cylindrical member 43 which projects downwardly into the glass and is rotated therein about a vertical axis. This member operates to define the flow path of the glass to the outlet, and also functions somewhat as a stirring device to continuously circulate the glass around the axis of the outlet, but mainly serves as a directing device or baffle which directs and continually shifts the path of flow of the glass to the outlet. The baffle 43 is cut away at one side to provide a passageway or gate 44 through which the glass flows from the channel 14 into the annular space 45 within the walls of the baffle and surrounding the plunger.

The lower end of the baffle is spaced a short distance from the floor of the boot, providing a restricted passageway permitting only a limited flow of glass, so that the greater portion of the glass issuing from the outlet is caused to enter through the opening 44. The baffle is adjustable vertically to permit a greater or less proportion of the glass to flow directly to the outlet without passing through the gate 44. The baffle 43 is supported in a yoke 46 mounted on the standards 22 and adjustable up and down thereon for the purpose of effecting said vertical adjustment of the baffle. The yoke 46 is locked in its adjusted position by a set screw 47.

The means for rotating the baffle 43 will now be described. An annular worm gear 48 is secured to the upper end of the baffle, said gear being rotatably mounted in the yoke 46. A plate 49 secured to the gear 48 overlies the yoke 46 and supports the baffle 43. A shaft 50 (Fig. 4) is journalled in bearings on the yoke 46 and carries a worm 51 running in mesh with the worm gear 48. A pinion 52 on the shaft 50 runs in mesh with a gear 53 on a shaft 54. A sprocket chain 55 provides a driving connection between the shaft 54 and the shaft 56 of an electric motor 57.

The motor operates through the gearing just described to impart a continuous rotation to the baffle 43. In this manner, the gate or passageway 44 is caused to travel continuously around the outlet 16, so that the main channel for the flow of glass to the outlet is being continuously shifted. In this way, stagnation or uneven chilling of the glass in any part of the container is prevented and the glass issuing from the outlet is maintained in a homogeneous condition.

As the tendency of a one-sided flow through the outlet is greatest when there is a direct line of flow from the channel 14 to the outlet, that is, when the gate 44 is in line with the channel 14, I have provided means whereby the movement of the baffle at this time is accelerated so that the gate will remain in such direct line for only a comparatively short time. For this purpose, there is provided in the circuit of the electric motor, a rheostat 58 (Fig. 1) and a switch comprising a lever 59 automatically actuated by a cam 60 formed on the plate 49. While the gate 44 is in the Figure 5 position in line with the channel 14, the switch lever 59 is in contact with the high portion of the cam, so that the motor circuit is through the line 61, whereby the resistance in the rheostat, or the greater portion thereof, is cut out of circuit, permitting the motor to run at a comparatively high speed. As the gate moves out of line with the channel 14, the switch is actuated to establish the circuit through the line 62, thereby introducing the rheostat resistance and slowing down the motor.

Figure 11 shows a modification wherein the rheostat arm 63 is operatively connected to a lever 64 running on the cam track. In this construction, the switch is omitted and the amount of resistance in the motor circuit is controlled by the movement of the arm 63 under the influence of the cam 60. This arrangement permits the speed of the baffle 43 to be varied at any desired period or periods during its rotation, and to any desired extent, the variations being determined by the contour of the cam track.

Figures 6 to 10 inclusive illustrate a construction comprising a modified form of baffle and mechanism for periodically oscillating the baffle instead of rotating it continuously. In the present instance, the baffle 70 is cut away to a greater extent so that the portion projecting downwardly into the glass is approximately semi-cylindrical or crescent shape, as indicated in Figure 10. The baffle is positioned between the channel 14 and the outlet, so that the glass flowing forward through the channel is deflected and passes to the forward side of the outlet. The baffle serves to divide the flow so that portions of the glass pass to either side of the baffle. A small portion may pass underneath the baffle, depending in amount on the vertical adjustment of the baffle. In this way there is effected a substantially uniform distribution to all points in the periphery of the outlet, of the flow of glass issuing from the outlet.

The baffle 70 is oscillated periodically about a vertical axis by means of an air motor 71 having a piston 72 to which is connected a rack 73 running in mesh with a gear 74 on the baffle. Air under pressure for actuating the motor 71 is admitted through a pipe 75 and controlled by a valve 76 actuated by a cam 77 on a shaft 78 driven continuously from the shaft 33 through a sprocket chain connection 79. The cam 77 may rotate at the same speed as the cam 23, so that the baffle 70 is oscillated in synchronism with the movements of the plunger. As the baffle swings in either direction it tends to divert the flow of glass to the opposite side of the regulator. In this manner, the path of flow of the glass is continually changed, thereby preventing stagnation or chilling in any part of the container. Also, the stirring effect of the baffle working in the glass operates to keep the glass properly mixed and in a homogeneous condition. The speed and frequency of oscillation of the baffle may readily be changed by changing the size of either of the sprocket wheels on which the chain 79 runs.

The plunger may either be made solid, as in Figure 7, or hollow, as in Figures 1 and 2, and any suitable means may be provided for circulating a cooling medium, such as air, water or steam, within the hollow plunger, if desired.

Modifications may be resorted to within the spirit and scope of my invention.

What I claim is:

1. Apparatus for feeding molten glass comprising, in combination, a container for the glass having an outlet opening in the bottom thereof and upwardly and outwardly divergent walls extending from said opening, and a regulator projecting downward into the glass over said outlet and formed with lower inclined walls forming with said first mentioned walls an annular downwardly divergent passageway for the glass to the opening.

2. Apparatus for feeding molten glass comprising, in combination, a container for the glass having an outlet opening in the bottom thereof and upwardly and outwardly divergent walls extending from said opening, and a regulator projecting downward into the glass over said outlet and formed with lower inclined walls forming with said first mentioned walls an annular downwardly divergent passageway for the glass to the opening, said regulator being of substantially greater diameter than the outlet.

3. Apparatus for feeding molten glass comprising, in combination, a container for the glass having an outlet opening in the bottom thereof and upwardly and outwardly divergent walls extending from said opening, and a regulator projecting downward into the glass over said outlet and formed with lower inclined walls forming with said first mentioned walls an annular passageway for the glass, the opposite walls of the passageway being downwardly convergent to a predetermined point and divergent below said point.

4. Glass feeding mechanism comprising, in combination, a container for molten glass, the floor of said container comprising downwardly inclined converging walls terminating in an outlet opening, a regulator projecting downward in the glass into the basin formed by said walls, said regulator being of larger diameter than the outlet, and having downwardly converging lower side walls coacting with said inclined walls to form an annular downwardly divergent passageway to the outlet and means to adjust the regulator vertically.

5. Glass feeding mechanism comprising, in combination, a container for molten glass, the floor of said container comprising downwardly inclined converging walls terminating in an outlet opening, and a regulator projecting downward in the glass into the basin formed by said walls, said regulator being of larger diameter than the outlet and forming with said inclined walls an annular passageway narrowest at an intermediate point.

6. The combination with a container for molten glass having an outlet opening in the bottom thereof, means to supply molten glass to the container at one side of said outlet, a baffle extending into the glass, means to rotate the baffle and thereby shift the path of flow of the glass to the outlet, and means to periodically vary the speed of rotation of the baffle.

7. The combination with a container for molten glass provided with an outlet opening in the bottom thereof, a cylindrical member projecting downward into the glass to surround the outlet, said member formed with a lateral opening, means to rotate said member, and automatic means to periodically vary the speed of rotation.

8. The combination with a container for molten glass provided with an outlet opening in the bottom thereof, a cylindrical member projecting downward into the glass to surround the outlet, said member formed with a lateral opening, means to rotate said member, and automatic means to increase the speed of rotation when said opening reaches a predetermined position.

9. The combination with a container for molten glass having an outlet in the bottom thereof, means to supply molten glass to the container at one side of said outlet, a baffle extendong into the glass, and formed with an opening for the passage of glass to the outlet, means to rotate the baffle and thereby shift the path of flow of the glass to the outlet, and automatic means to increase the speed of rotation when said opening is in the direct line of flow of the glass to the outlet.

10. The combination with a container for molten glass provided with an outlet opening in the bottom thereof, a cylindrical member projecting downward into the glass to surround the outlet, said member formed with a lateral opening, means to rotate said member, automatic means to periodically vary the speed of rotation, a regulator projecting downward into the glass over the outlet, and means to periodically reciprocate said regulator vertically.

11. The combination of a container for molten glass having an outlet opening through which the glass issues, means to supply glass to the container from one side thereof, a baffle projecting downward into the glass, means for rotating the baffle comprising an electric motor, a resistance in the motor circuit, and automatic means for periodically varying said resistance and thereby varying the speed of the motor.

12. The combination of a container for molten glass having an outlet opening through which the glass issues, means to supply glass to the container from one side thereof, a baffle projecting downward into the glass, means for rotating the baffle comprising an electric motor, a resistance in the motor circuit, a cam connected to rotate with the baffle, and a resistance varying member actuated by the cam.

13. The combination of a container for molten glass having an outlet opening through which the glass issues, means to supply glass to the container from one side thereof, a baffle projecting downward into the glass, means for rotating the baffle comprising an electric motor, a speed controlling device, and automatic means for periodically actuating said device and thereby periodically varying the speed of the motor.

14. The method which consists in causing molten glass to enter a container from one side thereof and discharge from the container through an outlet, progressively shifting the path of flow of a portion of the glass around the outlet, and periodically varying the speed at which the path of flow is shifted.

15. The method which consists in causing molten glass to enter a container from one side thereof and discharge from the container through an outlet in the bottom thereof, directing the path of flow of a portion of the glass from the point at which it enters the container to the outlet at one side thereof, progressively shifting the path of flow of a portion of the glass around the outlet, and periodically varying the speed at which the path of flow is shifted.

16. The method of giving like fluency and clinging propensity to a flow of molten glass which is in motion through the outlet passage of a glass discharging part, consisting in constantly shifting the path of a portion of the glass inflow to the passage, and periodically increasing and decreasing the speed at which said path is shifted.

17. The method of preventing unlike adhesion of molten glass to the walls of a glass discharging passage which consists in moving glass at relatively low speed to a major portion of the passage and at a higher speed to the minor portion, and in constantly changing the point of greatest speed of glass inflow to the passage around and adjacent the entrance thereto.

18. The method of maintaining like viscosity in the glass which contacts with the walls of a glass discharging outlet part consisting in so relating a glass movement controlling member to the glass which is in transit to the outlet as to form a single course for glass flow toward the outlet, and in progressively changing at a periodically varying speed, the course of the flow of a portion of the glass around and to the outlet so as to progressively deliver the flow at different points of the wall forming the outlet passage.

19. The method of retaining uniform conditions and glass mobility at a flow orifice consisting in so directing the course of a glass flow which is proceeding toward the orifice as to progressively change at a periodically varying speed, the direction of flow of glass to the flow orifice.

20. The method of controlling glass movement toward a glass discharging outlet from a glass body contiguous thereto, consisting in holding back the major portion of the contiguous glass body from direct movement to the orifice while constantly in succession imparting a direct movement toward the orifice to the minor portion of the glass.

21. The method of preventing stagnation in any portion of the glass which is contiguous to a glass discharging orifice which consists in constantly checking delivery movement from the major portion of the contiguous body toward the discharge orifice while causing the delivery movement of the minor portion of said glass to be primarily confined and occur in continuous sequence from a progressively changing point of the contiguous glass.

22. The method of handling glass movement from a body of glass to a glass releasing outlet which consists in establishing an artificial flow path in the glass above a mold charge releasing outlet and in shifting the course of a portion of the flow path so as to progressively and in consecutive order, circumferentially advance all portions of the body of glass contiguous and with respect to the outlet, and periodically increasing the speed at which the course is shifted when said course reaches a predetermined position circumferentially of the outlet.

23. The method of governing the quantity advance of glass toward an outlet consisting in providing a constantly replenished body of glass above an outlet, in establishing an artificial constantly shifting stream path in the body of glass toward the outlet, and in so governing the shifting of portions of the stream path as to selectively control the direction from which the greatest quantity advanced of the glass shall reach the outlet and correspondingly control the directional flow of the minor quantity adjacent the outlet.

24. The method of keeping the glass which is circum-local to a glass releasing outlet, in a state of like mobility, consisting in constantly changing at a periodically varying rate of speed, the path of movement of a major portion of a stream of glass flowing to the outlet, and correspondingly changing the path of movement of a minor portion of said stream of glass.

Signed at Toledo, in the county of Lucas and State of Ohio, this 28th day of November, 1924.

ENOCH T. FERNGREN.